United States Patent
Tokita et al.

(10) Patent No.: US 7,167,654 B2
(45) Date of Patent: Jan. 23, 2007

(54) OPTOELECTRONIC TRANSCEIVER WITH POWER VOLTAGE SUPPLY DETECTION

(75) Inventors: Shigeru Tokita, Yokohama (JP); Tomokazu Tanaka, Yokohama (JP); Cleitus Antony, Yokohama (JP); Tarou Tonoduka, Yokohama (JP); Masazumi Noguchi, Yokohama (JP)

(73) Assignee: OpNext Japan, Inc., Yokohama (JP)

( * ) Notice: Subject to any disclaimer, the term of this patent is extended or adjusted under 35 U.S.C. 154(b) by 643 days.

(21) Appl. No.: 10/420,108

(22) Filed: Apr. 17, 2003

(65) Prior Publication Data
US 2003/0228153 A1   Dec. 11, 2003

(30) Foreign Application Priority Data
Apr. 18, 2002   (JP) .............................. 2002-115772

(51) Int. Cl.
*H04B 10/00* (2006.01)
(52) U.S. Cl. ................ 398/138; 398/135; 398/182; 398/202; 327/198
(58) Field of Classification Search ........ 398/135–172, 398/182–214; 326/33; 327/141–143
See application file for complete search history.

(56) References Cited

U.S. PATENT DOCUMENTS

| | | | | |
|---|---|---|---|---|
| 5,323,066 A | * | 6/1994 | Feddeler et al. | ............ 327/142 |
| 5,910,739 A | * | 6/1999 | Stanojevic | ................... 327/143 |
| 6,163,183 A | * | 12/2000 | Azimi et al. | ................. 327/142 |
| 6,204,706 B1 | * | 3/2001 | Horvath | ....................... 327/198 |
| 2002/0149821 A1 | * | 10/2002 | Aronson et al. | ............ 359/152 |

FOREIGN PATENT DOCUMENTS

| | | |
|---|---|---|
| JP | 53-59330 A | 5/1978 |
| JP | 61-57387 A | 4/1986 |
| JP | 01-269114 A | 10/1989 |
| JP | 05-066862 A | 3/1993 |
| JP | 07-210272 | 8/1995 |
| JP | 2002-006996 A | 1/2002 |

* cited by examiner

*Primary Examiner*—Kenneth Vanderpuye
*Assistant Examiner*—Luis Garcia
(74) *Attorney, Agent, or Firm*—Townsend and Townsend and Crew LLP

(57) ABSTRACT

Optical transmission equipment with more than one power supply which can, when turning on the power supplies, set predetermined function of a signal processing circuit after a predetermined time period after the last turn-on of the power supply and can enable the operation of a drive circuit of the light emitting device after an additional predetermined time period.

2 Claims, 5 Drawing Sheets

OPTOELECTRONIC TRANSCEIVER WITH POWER VOLTAGE SUPPLY DETECTION

BACKGROUND OF THE INVENTION

The present invention relates to optical transmission equipment, and more particularly, to the improvement of the optical transmission equipment which uses more than one power supply for the circuit elements in the equipment.

Conventional optical transmission equipment prevents malfunction when turning on the power supply, in a manner such as that described in Japanese application patent laid-open publication No. Hei 07-210272. This application discloses to provide a forced discharge circuit in a reset circuit when turning on the power supply to prevent false output of the received output even in the case of power supply voltage return after very short voltage drop.

However, the optical transmission equipment may use a segmented power supply, in cases such as analog and digital mixed circuits used in the equipment, to keep noise generated in one circuit from interfering with other circuits. The optical transmission equipment with more than one integrated circuit also needs different power supply voltages for the circuits. Thus, the optical transmission equipment may often use more than one different power supply to power each circuit element. This may cause an unstable operation or a malfunction of the optical transmission equipment, such as inadequate reading of the desired set information, depending on when each power supply is turned on.

SUMMARY OF THE INVENTION

According to one aspect of the present invention, optical transmission equipment is provided comprising a signal processing circuit for sending and/or receiving an electrical signal to a light emitting and/or detecting device and for setting function of the equipment, and more than one different power supply for powering more than one circuit element in the equipment, the equipment further comprising means for detecting more than one power supply voltages and verifying that more than one predetermined power supply voltage are turned on and for setting predetermined operating condition of the signal processing circuit after the verification.

The means for setting the predetermined operating condition of the signal processing circuit can preferably enable the operation of the circuit or set predetermined function of the circuit.

According to another aspect of the present invention, optical transmission equipment is provided comprising a light emitting and/or light detecting device for transmitting and/or receiving an optical signal, and more than one different power supply for powering more than one circuit element in the equipment, the equipment further comprising means for detecting more than one power supply voltages and verifying that more than one predetermined power supply voltage are turned on and for enabling the transmitting and/or receiving of the optical signal after the verification.

The means for enabling the transmitting and/or receiving of the optical signal may transform the partial function at any point in the equipment from the stopping state to the operating state.

According to still another aspect of the present invention, optical transmission equipment is provided comprising: a light emitting and/or light detecting device; a drive circuit and/or amplifier connected to the device; a signal processing circuit for processing the transmission and/or receiving electrical signal; and more than one different power supply for powering more than one circuit element in the equipment, the equipment further comprising means for detecting more than one power supply voltages and verifying that more than one predetermined power supply voltage are turned on and for setting predetermined operating condition of the signal processing circuit after a predetermined time period after the verification.

The optical transmission equipment may preferably comprise additional means for enabling the operation of the drive circuit and/or amplifier after a predetermined time period after the setting of the operating condition of the signal processing circuit.

In this way, the optical transmission equipment with more than one power supply can, when turning on the power supplies, set predetermined operating condition of the functional circuits in the equipment in response to the timing of the last turn-on of the power supply, thus providing stable operation of the equipment.

BRIEF DESCRIPTION OF THE DRAWINGS

Preferred embodiments of the present invention will now be described in conjunction with the accompanying drawings, in which.

DETAILED DESCRIPTION OF THE INVENTION

Figure 1:
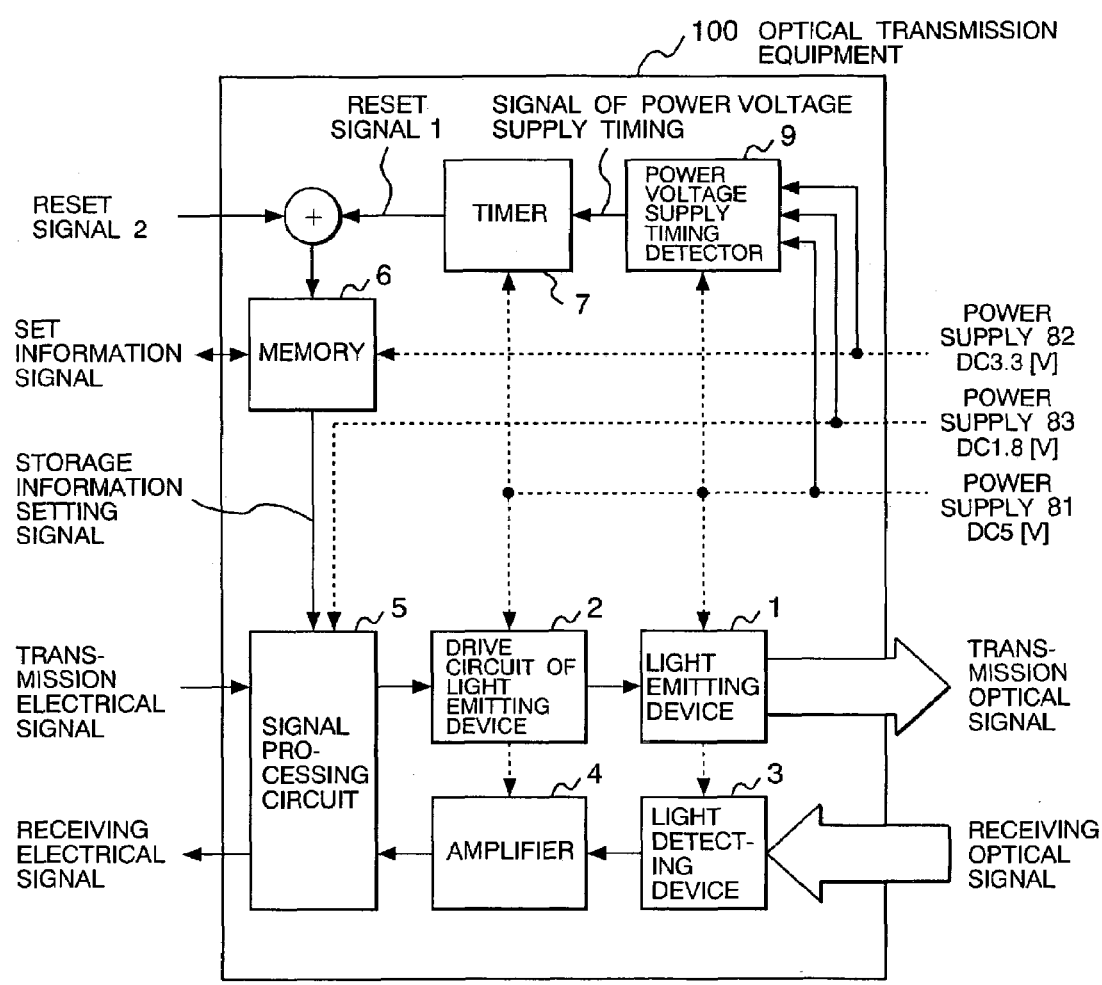
FIG. 1 shows a function block diagram of the optical transmission equipment according to the first embodiment of the present invention.

FIG. 1 shows a function block diagram of optical transmission equipment 100 according to the first embodiment of the present invention. The optical transmission equipment 100 includes a light emitting device 1, drive circuit 2 of the light emitting device, light detecting device 3, amplifier 4, signal processing circuit 5, memory 6, and timer 7. The signal processing circuit 5 can perform processings such as code modulation or computing of the transmission electrical signal and the output signal of the amplifier 4. Information stored in the memory 6 can set the function of the signal processing circuit 5. In other words, the memory 6 is a means for setting predetermined operating condition of the signal processing circuit 5. External set information signal can provide the set information on the code modulation and computing processings. The memory 6 can store the provided set information. The memory 6 can send the storage information setting signal to the signal processing circuit 5 in response to a reset signal 1 from the timer 7 or to an external reset signal 2 which is input as necessary.

The function of the exemplary signal processing circuit 5 will be described below in more detail. The signal processing circuit 5 can perform the following functions: (1) code modulation of the transmitting and/or receiving electrical signal, (2) selection of more than one processing such as A, B, or C, (3) selection of the processing path, (5) turning on/off of the path or processing (means for enabling the transmission and/or receiving of the optical signal), and (4) others.

The storage information setting signal stored in the memory 6 can set the above functions. Thus the power supply 82 needs to surely power the memory 6 before the memory 6 sends the storage information setting signal. In addition, the signal processing circuit 5 may take a certain time to set up its function.

The optical transmission equipment primarily includes analog circuits of a light emitting device 1, drive circuit 2 of the light emitting device, light detecting device 3, and amplifier 4, and digital circuits of a signal processing circuit 5, memory 6, and timer 7. Each of these components needs different power supplies. Three different power supplies 81–83 are used in this embodiment. As shown in FIG. 1 by the power supply lines in broken lines, the power supply 81 of DC 5[V] powers the analog circuits including the light emitting device 1, drive circuit 2 of the light emitting device, light detecting device 3, amplifier 4, and timer 7. The power supply 82 of DC 3.3[V] powers the memory 6. The power supply 83 of DC 1.8[V] powers the signal processing circuit 5.

The reset signal 1 from the timer 7 responds to a signal of power voltage supply timing signal from the power voltage supply timing detector (power voltage supply timing detecting means). The power voltage supply timing detector 9 can detect the voltages of more than one power supply powering each component in the optical transmission equipment 100. Three power supplies 81–83 are detected in this embodiment. The power voltage supply timing detector 9 detects the voltages of these three power supplies and sends the signal of power voltage supply timing after all the power supply voltages are turned on. Thus, when turning on the power supplies, the signal of power voltage supply timing occurs in response to the last turn-on of the power supply.

Figure 2:
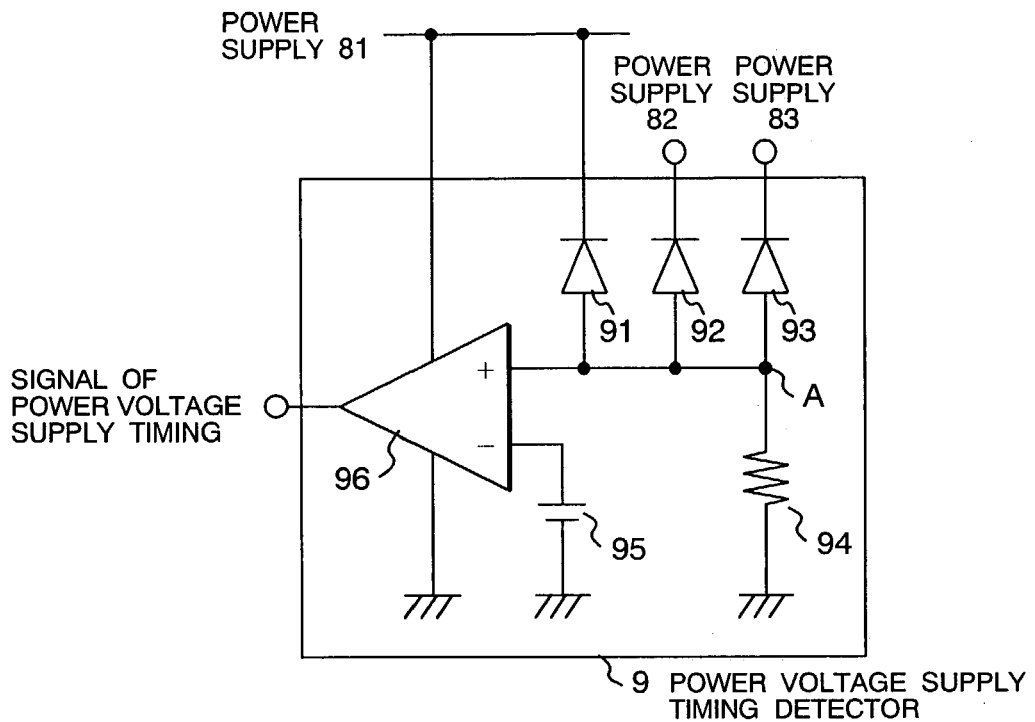
FIG. 2 shows a circuit diagram of the power voltage supply timing detector according to the first embodiment of the present invention.

FIG. 2 shows an example of specific circuitry of the power voltage supply timing detector 9. The power voltage supply timing detector 9 in FIG. 2 includes diodes 91–93, a resistor 94, a reference voltage generator 95, and a comparator 96. The diodes 91–93 connect in the forward direction to the power supplies 81–83, respectively. These diodes 91–93 and the resistor 94 can form an AND circuit which can make the electric potential at the point A in FIG. 2 high level only when all the power supply voltages are ON. Thus the point A reaches a high potential in response to the turn-on timing of the last turned on power supply of the more than one power supplies. The comparator 9 produces the signal of power voltage supply timing when the point A has a potential higher than the reference potential produced by the reference voltage generator 95. The power supply 81 can power the power voltage supply timing detector 9 as shown in FIG. 2.

Figure 3:
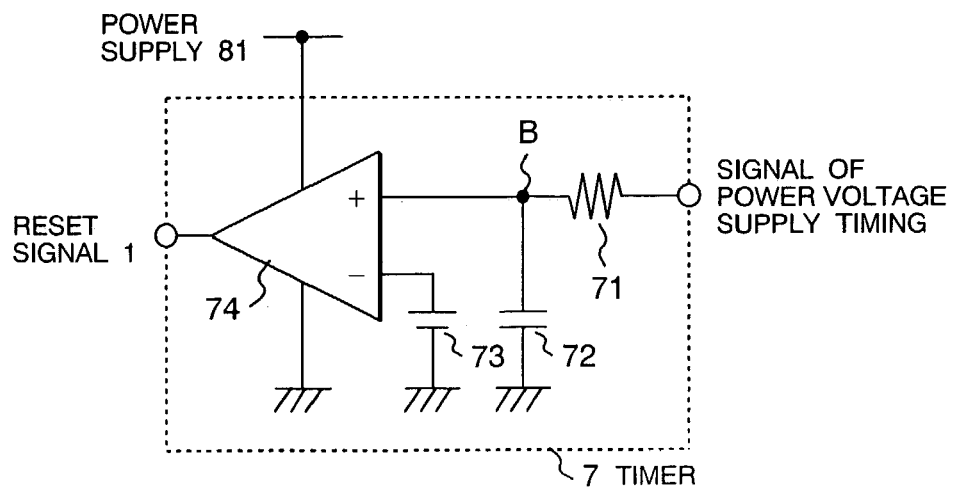
FIG. 3 shows a specific circuit diagram of the timer according to the first embodiment of the present invention.

FIG. 3 shows an example of specific circuitry of the timer 7. The timer 7 produces a reset signal 1 delayed by a predetermined time period behind the signal of power voltage supply timing from the power voltage supply timing detector 9. The timer 7 includes a resistor 71, capacitor 72, reference voltage generator 73, and comparator 74. When the timer 7 receives the signal of power voltage supply timing, the point B in FIG. 3 increases its potential with a time constant given by the product of the resistance of the resistor 71 and the capacitance of the capacitor 73. The comparator 74 produces the reset signal 1 when the point B has a potential higher than the reference potential produced by the reference voltage generator 73. In this way, the timer 7 produces the reset signal 1 delayed behind the signal of power voltage supply timing by the time period according to the time constant.

Figure 4A:
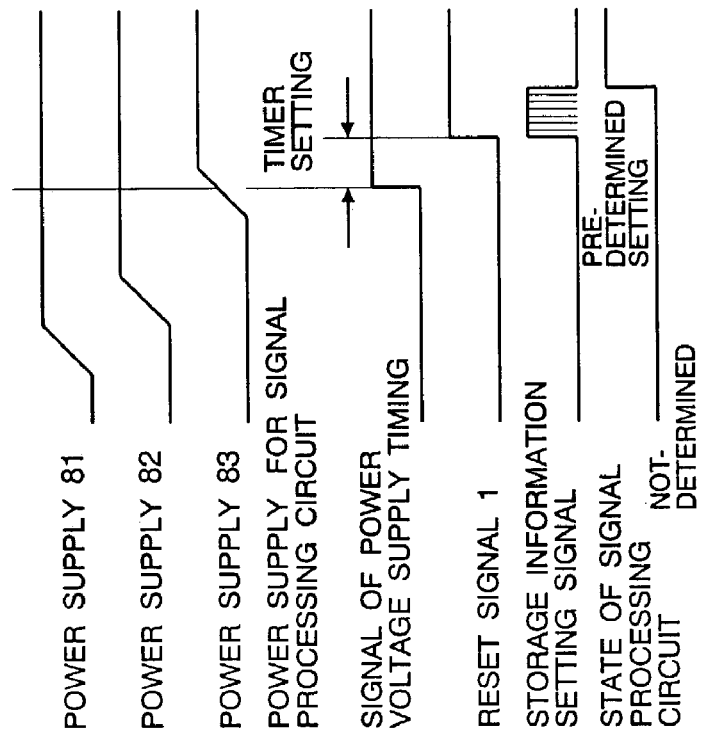
FIGS. 4A and 4B show operation time charts during turn-on of the power supplies of the optical transmission equipment according to the first embodiment of the present invention.
Figure 4B:
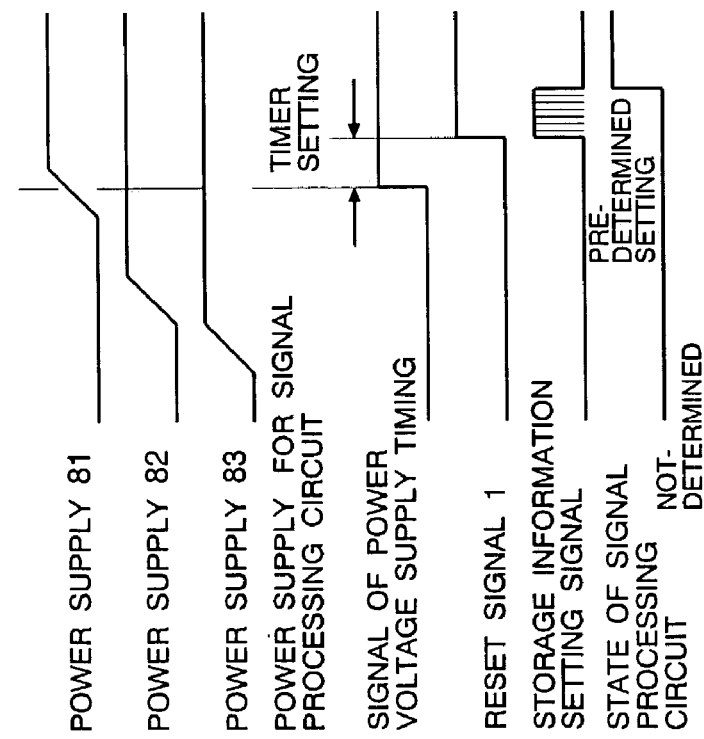

FIGS. 4A and 4B show operation time charts of the power supply turn-on sequence and each component's response in the optical transmission equipment according to the first embodiment of the present invention.

FIG. 4A shows the case where the power supply 81 is turned on later than the other power supplies 82, 83. The signal of power voltage supply timing occurs in response to the last turn-on of the power supply 81. After a predetermined time period has passed after the signal of power voltage supply timing, the timer 7 produces the reset signal 1 and the memory 6 sends the storage information setting signal to the signal processing circuit 5. When the storage information setting signal is produced, all the power supplies 81–83 are already turned on and the internal circuits in the optical transmission equipment 100 are operable. Thus, the optical transmission equipment 100 can operate reliably in a predetermined setting up.

FIG. 4B shows the case where the power supply 83 for the signal processing circuit 5 is turned on later than the other power supplies 81, 82. The signal of power voltage supply timing occurs in response to the last turn-on of the power supply 83. Again, all the power supplies 81–83 are already turned on and the internal circuits in the optical transmission equipment 100 are operable. Thus, the optical transmission equipment 100 can operate reliably in a predetermined setting up.

As mentioned above, the optical transmission equipment 100 shown in FIG. 1 can start up in response to the last turn-on of the power supply even if the power supplies are irregularly turned on as shown in FIGS. 4A and 4B. The internal circuits in the optical transmission equipment 100, particularly the signal processing circuit 5, drive circuit 2 of the light emitting device, and amplifier 4 can surely be powered by their power supplies 81–83 before they receive predetermined command, so that the optical transmission equipment 100 can operate reliably.

Figure 5:
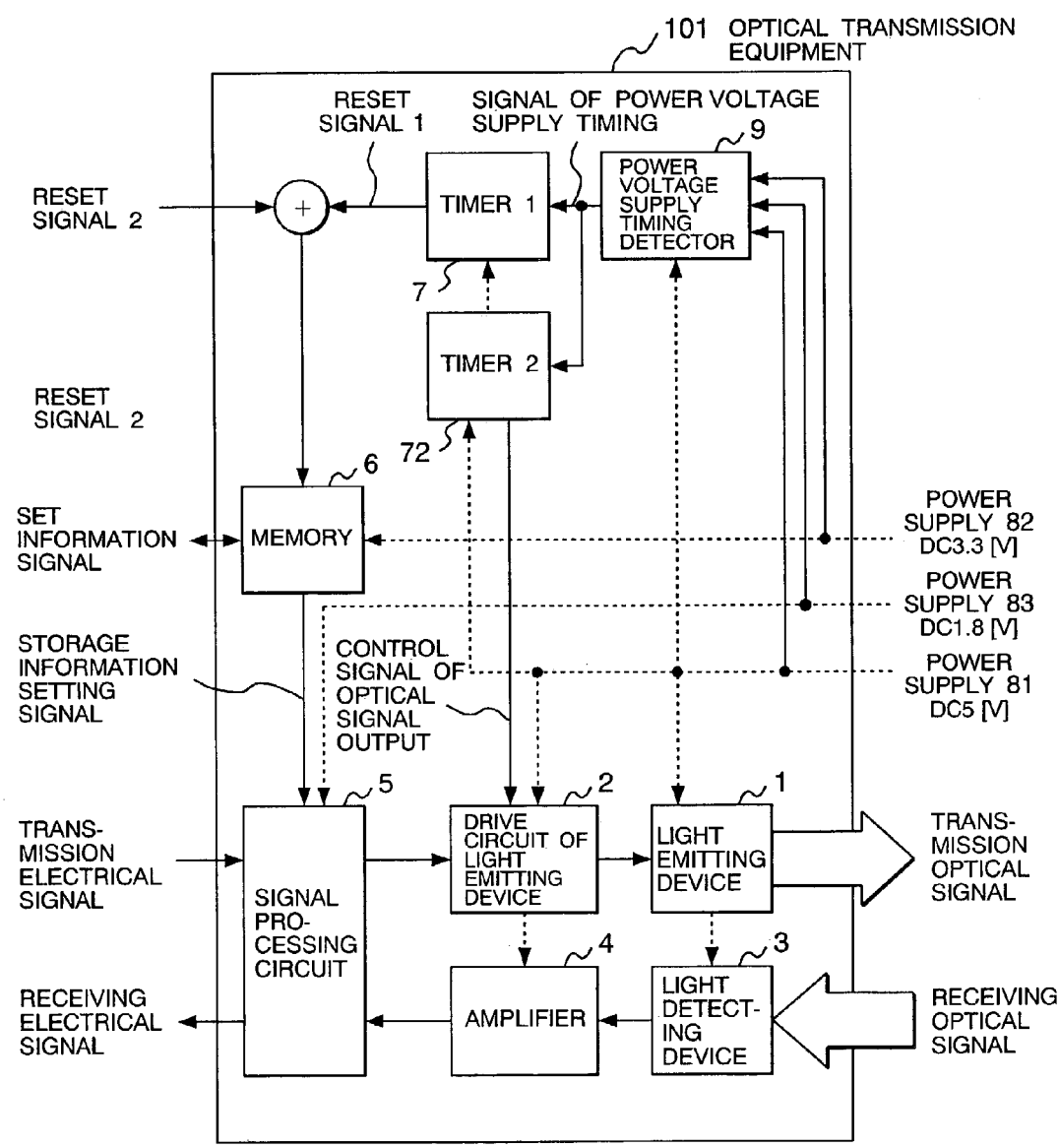
FIG. 5 shows a function block diagram of the optical transmission equipment according to the second embodiment of the present invention.

FIG. 5 shows a function block diagram of the optical transmission equipment 101 according to the second embodiment of the present invention. In FIG. 5, like numbers refer to functionally-similar elements in FIG. 1. Unlike the first embodiment in FIG. 1, the optical transmission equipment 101 further includes a second timer 75 which can send a control signal of the optical signal output to the drive circuit 2 of the light emitting device after a predetermined time period after receiving the signal of power voltage supply timing. A specific example of the circuitry of the second timer 75 includes the similar circuitry shown in FIG. 3. The second timer 75 has a longer time constant than the first timer 7 so that it can produce the control signal of the optical signal output after the reset signal 1. Until receiving the control signal of the optical signal output, the drive circuit 2 of the light emitting device will stop powering the light emitting device 1 to stop outputting the transmission optical signal.

Figure 6:
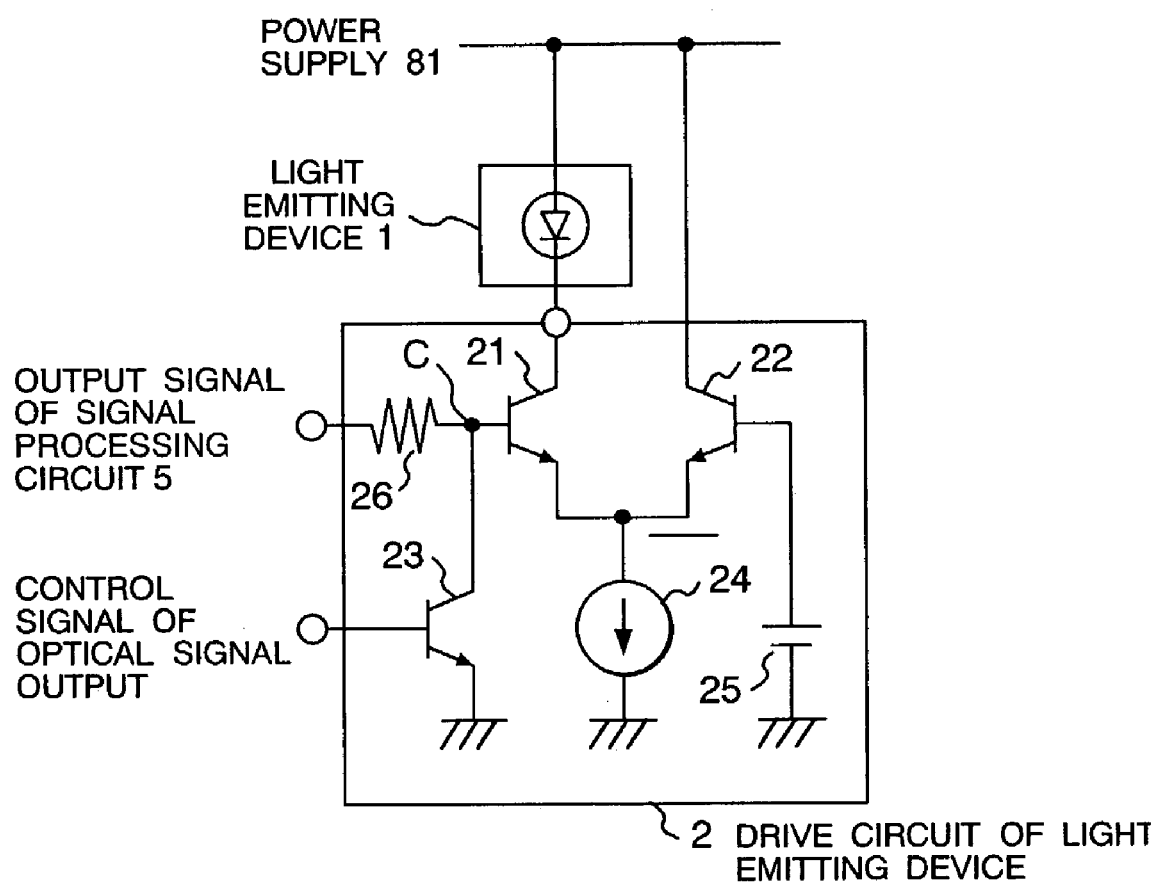
FIG. 6 shows a circuit diagram of the drive circuit of the light emitting device according to the second embodiment of the present invention.

FIG. 6 shows specific circuitry of the drive circuit 2 of the light emitting device. The drive circuit 2 of the light emitting device includes transistors 21–23, a current source 24, a reference voltage generator 25, and a resistor 26. The transistor 21 and 22 are used in the well-known differential connection to form a differential amplifier. In response to the output signal from the signal processing circuit 5, the drive circuit 2 of the light emitting device will modulate the driving current from the current source 24 and supply the modulated current to the light emitting device 1 through the collector of the transistor 21. Combination of the current source 24 and differential amplifier can supply, in response to an input signal, the light emitting device 1 with a stable current which represents gradual rise and fall.

When the control signal of the optical signal output is not input and the base is kept positive, the transistor 23 is turned on so that the point C has a potential lower than that of the reference voltage generator 25. The transistor 21 is then completely turned off and a constant current will flow through the transistor 22. Thus, the light emitting device 1 is provided with no current and can surely stop sending the transmission optical signal.

When the three power supplies 81–83 are all turned on, the power voltage supply timing detector 9 will produce the signal of power voltage supply timing as shown in FIG. 5. Receiving this signal, the timer 7 produces the reset signal 1 after a predetermined time period. The memory 6 then will send the storage information setting signal to the signal processing circuit 5 to set the predetermined function of the circuit 5. The second timer 72 will provide, behind the reset signal 1, the drive circuit 2 of the light emitting device with the control signal of the optical signal output. In other words, the second timer 72 is a means for enabling the transmission of the optical signal in the drive circuit 2 of the light emitting device. Thus, even when the signal processing circuit 5 takes a certain time to set its predetermined function, the drive circuit 2 of the light emitting device can receive the output signal from the circuit 5 in which the proper operation has been established, before the drive circuit 2 starts to drive the light emitting device 1. In this way, in the optical transmission equipment 101 in FIG. 5, the drive circuit 2 of the light emitting device will not receive the control signal of the optical signal output before the signal processing circuit 5 receives the storage information setting signal from the memory 6, so that the equipment 101 will not malfunction.

As mentioned above, optical transmission equipment with more than one power supply is provided which can start up reliably for any power supply sequence.

We claim:

1. An optoelectronic transceiver with power voltage detection comprising:

a light emitting device for transmitting an optical signal;

a light detecting device for receiving an optical signal;

a drive circuit for sending a transmission electrical signal to said light emitting device;

an amplifier for amplifying a receiving electrical signal from said light emitting device;

a signal processing circuit for processing the transmission and/or receiving electrical signal at the front stage of said drive circuit and/or amplifier;

more than one different power supply for powering more than one circuit element in said optoelectronic transceiver;

a power voltage supply timing detecting means for detecting the voltages of said more than one power supply and verifying that more than one predetermined power supply voltage are turned on;

a first timer configured to output a first reset signal after a predetermined time period after the verification by said detecting means;

a second timer configured to output a second reset signal after a predetermined time period after the verification by said detecting means; and a memory to output a storage information setting signal which sets a predetermined operation condition of said signal processing circuit, wherein said memory is configured to output said storage information setting signal subsequent to receiving said first reset signal, wherein said drive circuit transmits said transmission electrical signal to said light emitting device subsequent to receiving said second reset signal.

2. The optoelectronic transceiver of claim 1, wherein said second reset signal is output after a predetermined period time lapses subsequent to outputting the first reset signal.

* * * * *